US012402757B2

(12) United States Patent
Pigazzi

(10) Patent No.: US 12,402,757 B2

(45) Date of Patent: Sep. 2, 2025

(54) TRIGGER-TYPE DISPENSING HEAD FOR A DISPENSING DEVICE FOR PASTY PRODUCTS SUCH AS TOOTHPASTES

(71) Applicant: GUALA DISPENSING S.P.A., Alessandria (IT)

(72) Inventor: Alessandro Pigazzi, Alessandria (IT)

(73) Assignee: GUALA DISPENSING S.P.A., Alessandria (IT)

( * ) Notice: Subject to any disclaimer, the term of this patent is extended or adjusted under 35 U.S.C. 154(b) by 190 days.

(21) Appl. No.: 18/552,464

(22) PCT Filed: Mar. 9, 2022

(86) PCT No.: PCT/IB2022/052085

§ 371 (c)(1),
(2) Date: Sep. 26, 2023

(87) PCT Pub. No.: WO2022/208198

PCT Pub. Date: Oct. 6, 2022

(65) Prior Publication Data

US 2024/0164592 A1 May 23, 2024

(30) Foreign Application Priority Data

Mar. 30, 2021 (IT) ........................ 102021000007847

(51) Int. Cl.
*A47K 5/12* (2006.01)
*B05B 11/10* (2023.01)

(52) U.S. Cl.
CPC ........ *A47K 5/1201* (2013.01); *B05B 11/1001* (2023.01); *A47K 5/1208* (2013.01);
(Continued)

(58) Field of Classification Search
CPC ...... A47K 5/1201; A47K 5/12; A47K 5/1208; A47K 5/1202; B05B 11/103; B05B 11/10;
(Continued)

(56) References Cited

U.S. PATENT DOCUMENTS 4,154,371 A 5/1979 Kolaczinski et al.
4,402,431 A 9/1983 Wiegner et al.
(Continued)

FOREIGN PATENT DOCUMENTS

EP 1939111 A1 7/2008
FR 2659631 A1 9/1991
(Continued)

OTHER PUBLICATIONS

International Search Report for International Patent Application No. PCT/IB2022/052085, mailed Jun. 2, 2022.

*Primary Examiner* — David J Walczak
(74) *Attorney, Agent, or Firm* — _Armstrong Teasdale LLP

(57) ABSTRACT

A dispenser for pasty products having a fixed head that has a dispensing duct for dispensing a product, a pump with an elastically deformable cap, a manually-operated actuator, a separating wall with a suction inlet, and a suction valve cooperating with the suction inlet. The suction valve has a valve body and a plurality of tabs that bend and open the suction inlet in a product suction step, and close the suction inlet in a product dispensing step.

10 Claims, 9 Drawing Sheets

(52) U.S. Cl.
CPC ........... *B05B 11/10* (2023.01); *B05B 11/1009* (2023.01); *B05B 11/1011* (2023.01); *B05B 11/1029* (2023.01); *B05B 11/103* (2023.01)

(58) Field of Classification Search
CPC ............. B05B 11/1009; B05B 11/1011; B05B 11/1012; B05B 11/1028; B05B 11/1029; B05B 11/1001; B65D 83/765
USPC ..... 222/383.1, 372, 386, 387, 378; 401/152, 401/156, 158, 188 R
See application file for complete search history.

(56) References Cited

U.S. PATENT DOCUMENTS

| | | | | | |
|---|---|---|---|---|---|
| 4,821,926 | A * | 4/1989 | Battegazzore | B65D 83/765 | 222/387 |
| 4,903,867 | A | 2/1990 | Mettenbrink | | |
| 5,176,291 | A * | 1/1993 | Fillmore | B65D 83/765 | 222/325 |
| 12,240,683 | B2 * | 3/2025 | Alluigi | B05B 11/028 | |

FOREIGN PATENT DOCUMENTS

| | | | |
|---|---|---|---|
| WO | 2022090947 | A1 | 5/2022 |
| WO | 2022090948 | A1 | 5/2022 |

* cited by examiner

TRIGGER-TYPE DISPENSING HEAD FOR A DISPENSING DEVICE FOR PASTY PRODUCTS SUCH AS TOOTHPASTES

CROSS-REFERENCE TO RELATED APPLICATIONS

This application is a National Stage Application of International Patent Application No. PCT/IB2022/052085, having an International Filing Date of Mar. 9, 2022, which claims priority to Italian Application No. 102021000007847 filed Mar. 30, 2021, the entire contents of which are hereby incorporated by reference herein.

FIELD OF THE INVENTION

The subject matter of the present invention is a pushbutton dispenser for pasty products, particularly toothpastes.

BACKGROUND OF THE INVENTION

Such dispensers have been known for some time, and the Applicant itself holds the patent family coming under document U.S. Pat. No. 4,821,926. Such dispensers have been and continue to be widely known for certain advantages that set them apart from normal toothpaste tubes, such as, for example, ease of use, the ability to dispense practically all of the toothpaste without any remaining, and other advantages.

There are essentially two types of these dispensers on the market.

A first type, used especially for high-viscosity pastes, provides a metal stop ring on the bottom of the tube which, when the pushbutton is released (suction phase), advances together with the piston toward the top of the tube and prevents the piston from recoiling toward the bottom of the tube when the pushbutton is pressed (dispensing phase). An embodiment example is described in document U.S. Pat. No. 4,154,371.

A second type, used in particular for medium- or low-viscosity pastes, comprises parts having lips or diaphragms that work as check valves, and therefore the piston does not have to cooperate with a stop ring. An embodiment example is described in document U.S. Pat. No. 4,402,431.

This latter type is quickly becoming widespread because it is possible to make all the components out of plastic materials belonging to the same family. As such, these dispensers are easily recyclable and meet current environmental protection requirements. For example, the Applicant is the holder of Italian patent application Nos. 10 2020 000 025 597 and 10 2020 000 025 594.

SUMMARY OF THE INVENTION

The purpose of the present invention is to make a dispenser for pasty products, especially toothpastes, that meets the requirements of the sector, particularly concerning the use of plastic materials, and allows for effective dispensing, especially with regard to suction of the product.

This purpose is achieved by a head assembly for dispensers and by a dispenser as described and claimed herein. Advantageous embodiments of the present invention are also described.

BRIEF DESCRIPTION OF THE FIGURES

The features and advantages of the dispenser according to this invention will become apparent from the following description, given as a non-limiting example in accordance with the figures in the accompanying drawings, wherein.

DETAILED DESCRIPTION

Figure 1:
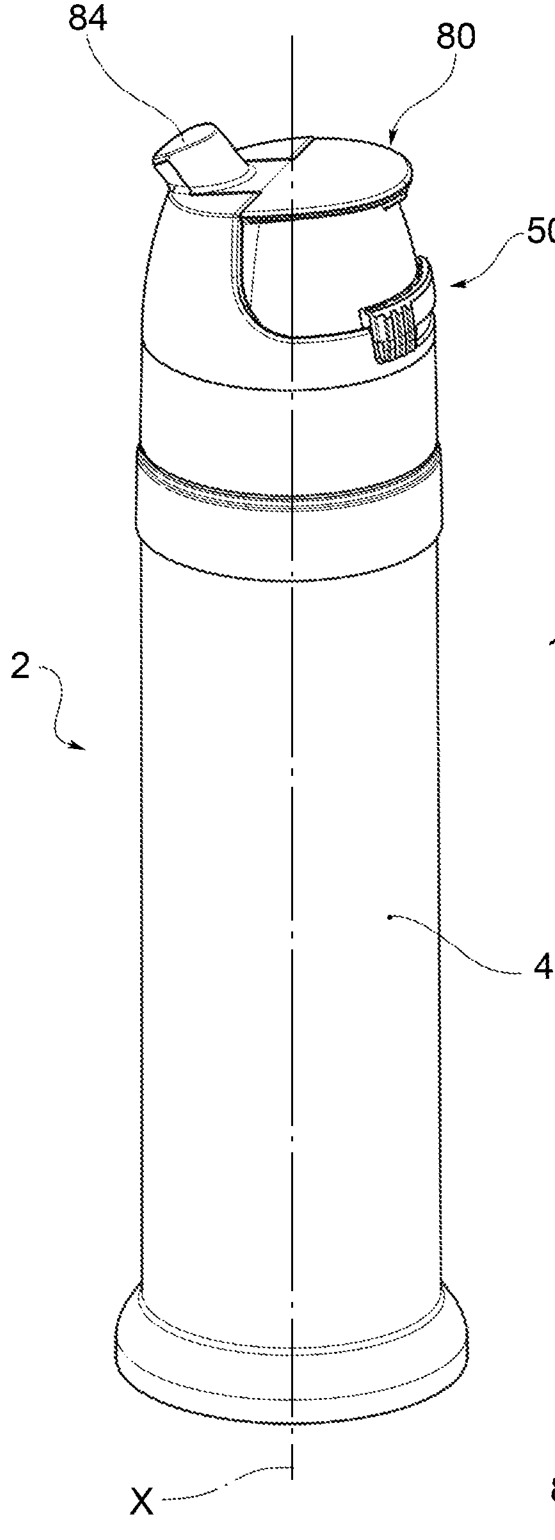
FIG. 1 depicts a dispenser for pasty products according to an embodiment of the present invention.
Figure 2:
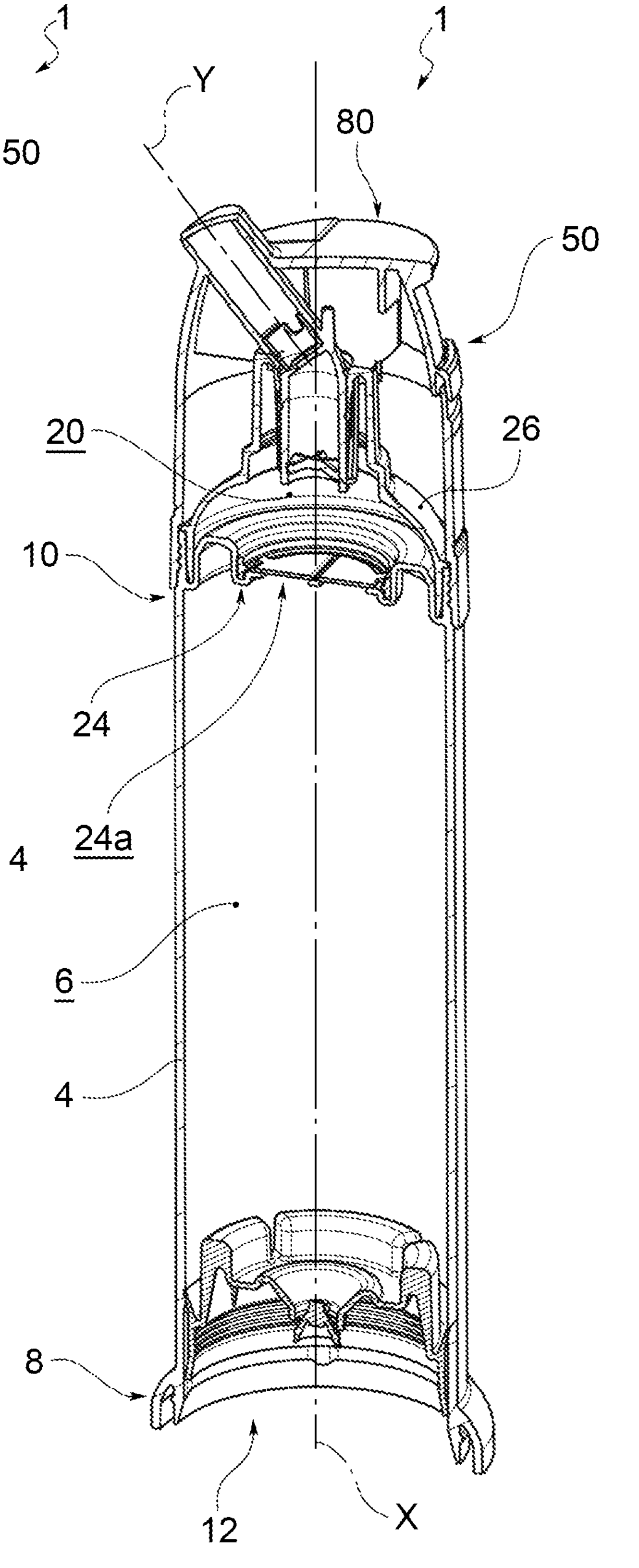
FIG. 2 is a cross-sectional view of the dispenser in FIG. 1.

In reference to the figures in the appended drawings, number 1 refers to a dispenser for pasty products, particularly toothpastes, as a whole according to an embodiment of the present invention.

The dispenser 1 comprises a container tube 2, preferably made as a single part from plastic material, for example a polymer material belonging to the polyolefin group, such as polypropylene (PP).

The container tube 2 comprises an annular tube wall 4, typically circular and cylindrical, having a central axis X. The tube wall 4 delimits a periphery of a tube compartment 6 intended to contain the pasty product. The tube wall 4 goes from a lower end 8, which is itself open and through which the tube wall 4 is filled with the pasty product, to an upper end 10 to which a dispensing head 50, to be discussed later, is applied.

The dispenser 1 further comprises a piston 12 received into the tube compartment 6 by an interference fit, designed to slide axially from the lower end 8, where it is located when the tube compartment 6 is full of product, to the upper end 10 as the product is dispensed.

Preferably, the piston 12 is made of a plastic material, preferably a polymer material belonging to the polyolefin group, for example high-density polyethylene (HDPE).

The dispensing head 50 further comprises a main chamber 20 placed at the upper end 10 of the container tube 2 for containing the product that is about to be dispensed.

According to a preferred embodiment, the main chamber 20 is delimited at the bottom by a separating wall 24 occupying the tube compartment 6 in the diameter direction, and at the top by a cap 26 of a pump 28. The separating wall 24 is provided with a suction inlet 24*a* capable of establishing communication between the tube compartment 6 and the main chamber 20.

The suction inlet 24*a* sits on an imaginary plane K perpendicular to the main axis X.

According to an embodiment of the invention, the separating wall 24 is a single part together with the container tube 2.

For example, the separating wall 24 comprises an annular outer portion 30, preferably coaxial with the tube wall 4, radially close to an end section 22 of the tube wall 4 with which it forms an annular seat 32 for the pump 28.

In addition, the separating wall 24 preferably comprises an annular functional seat 34, preferably placed inside the outer portion 30, to accommodate a support for a valve body, which will be discussed later herein, and a support crown 35, placed radially inside the functional seat 34, to support said valve body.

The dispensing head 50 further comprises a fixed head 40 which can be placed on the container tube 2 at the upper end 10. For example, the fixed head 40 is snapped into the end section 22 of the tube wall 4.

The fixed head 40 comprises a dispensing duct 42 for connecting the main chamber 20 to the outside environment for dispensing the product.

Preferably, the dispensing duct 42 comprises an initial section 44 that opens directly into the main chamber 20, and an end section 46 connected to the initial section 44 and ending with an opening 47 for dispensing the product.

Preferably, the initial section 44 lies along a main axis, preferably coaxial to the tube wall 4, i.e., coaxial to the central axis X: the end section 46, however, is preferably at an angle and therefore lies along a dispensing axis Y that is inclined with respect to the central axis X.

Once the fixed head 40 is placed on the container tube 2, a space 43 is delimited between said fixed head 40 and the separating wall 24 in which is placed the pump 28, which is applied to and cooperates with the separating wall 24 and the dispensing duct 42.

The pump 28, consisting of a hollow shell, is made as a single part from plastic material, for example a polymer material belonging to the polyolefin group, such as low-density polyethylene (LDPE).

Preferably, the pump 28 comprises an annular connection portion 52 consisting, for example, of a preferably continuous cylindrical circular wall, designed to be housed by interference fit in the seat 32 formed by the tube wall 4 and the separating wall 24.

The pump 28 further comprises a dome-shaped elastically deformable cap 54 diverging toward the connection portion 52. Said cap 54 is designed to be deformed with respect to a rest condition in order to reduce the volume of the main chamber 20 and cause the product to be dispensed. Preferably, the cap 54 is connected to the connection portion 52 at a lower end.

The pump 28 further comprises, at the end opposite the end of the connection portion 52, a pump neck 55 connected to the cap 54 and protruding axially therefrom. The pump neck 55 is slidably inserted into the initial section 44 of the dispensing duct 42.

For example, the pump neck 55 consists of a tubular column portion 56, preferably coaxial with the central axis X, and a tubular guide portion 58 connected to the column portion 56 and contained radially and preferably also axially therein. In other words, the guide portion 58 forms a flap with respect to the column portion 56, thus making therewith an annular upside-down-U section.

The dispensing head 50 further comprises an intermediate valve or shutoff valve allowing product to go from the main chamber 20 to the dispensing duct 42 during a product dispensing phase, and preventing product from coming out of the main chamber 20 and from going to the dispensing duct 42 when the container tube is being filled with the product.

For example, the pump 28 comprises a bottom 60 supported by the pump neck 55 and in particular by the guide portion 58: the bottom 60 is provided with a plurality of bottom openings 62 arranged circumferentially. Once the pump 28 and the fixed head 40 are placed on the container tube 2, the initial section 44 of the dispensing duct 42 is inside the guide portion 58 and, in an initial rest condition, the appropriately shaped free end **44*b* of said initial section 44 closes said bottom openings 62 of the bottom 60. The free end 44*b* and the bottom 60 provided with bottom openings 62 form, for example, an intermediate or shutoff valve 64**.

The dispensing head 50 further comprises an upper or delivery valve placed downstream of the intermediate valve for allowing product to go from the main chamber 20 to the outdoor environment during a product dispensing phase, and for preventing the return of product or outdoor environment air to the main chamber 20 during a product suction phase.

For example, a delivery port 66 is placed at the connection between the initial section 44 and the end section 46 of the dispensing duct 42, a bowl 67 housed in the end section 46 cooperating therewith, said bowl 67 consisting of an annular cup wall 69 and a flexible cup flap 71 for closing the delivery port 66, acting as a shutter. The delivery port 66 and the cup flap 71 constitute an example of said upper valve or delivery valve.

The dispensing head 50 further comprises a lower or suction valve for allowing product to go from the tube compartment 6 to the main chamber 20 during a product suction phase, and for preventing the return of product from the main chamber 20 to the tube compartment 6 during a product dispensing phase.

To that end, according to the invention, the dispensing head 50 comprises a valve body 73 that cooperates with the suction inlet **24*a***.

Preferably, the valve body 73 comprises a support 75 consisting, for example, of an annular wall, received at least partially into the functional seat 34 of the separating wall 24, and a plurality of of tabs 77',77" contained in the support 75 which, by cooperating with each other and with the separating wall 24, are capable of closing off the suction inlet **24*a***.

In addition, the valve body 73 preferably comprises a plurality of hinge portions 79, wherein each hinge portion 79, which is elastically deformable, connects a tab 77 to the support 75 and, by deforming, allows said tab to move from a closed configuration of the suction inlet **24*a* during the product suction phase to an open configuration of the suction inlet 24*a*** during the product dispensing phase.

In particular, by means of said hinge portions 79, each tab 77', 77" is arranged in a cantilevered fashion inside the support 75, that is, spaced from said support so as to form an annular gap **75*a* therewith, except at said hinge portions 79**.

According to a first embodiment variant (FIGS. **3*a*, 3*b*, and from 4a to 4*c*) in which the suction inlet 24*a* is divided by a crosspiece 24*a*', preferably along the diameter, the valve body 73 comprises two tabs 77': for example, each tab 77' is connected to the support 75 by two hinge portions 79**.

For example, each tab 77' has the shape of a half moon, provided with a perimeter edge 81" having an arched section 83', preferably in the shape of a semicircle, facing toward the support 75, and a straight section 85' facing the straight section of the other tab.

In the closed configuration, the straight sections 85' of the tabs 77 press against the crosspiece 24*a*' of the suction inlet 24*a*, whereas the gap 75*a* between the arched sections 83' and the support 75 rests on the crown 35 of the separating wall 24. In the open configuration, however, the tabs 77' bend due to the deformation of the hinge portions 79 and/or the tab itself, thus opening the suction inlet 24*a*.

Figure 5A:
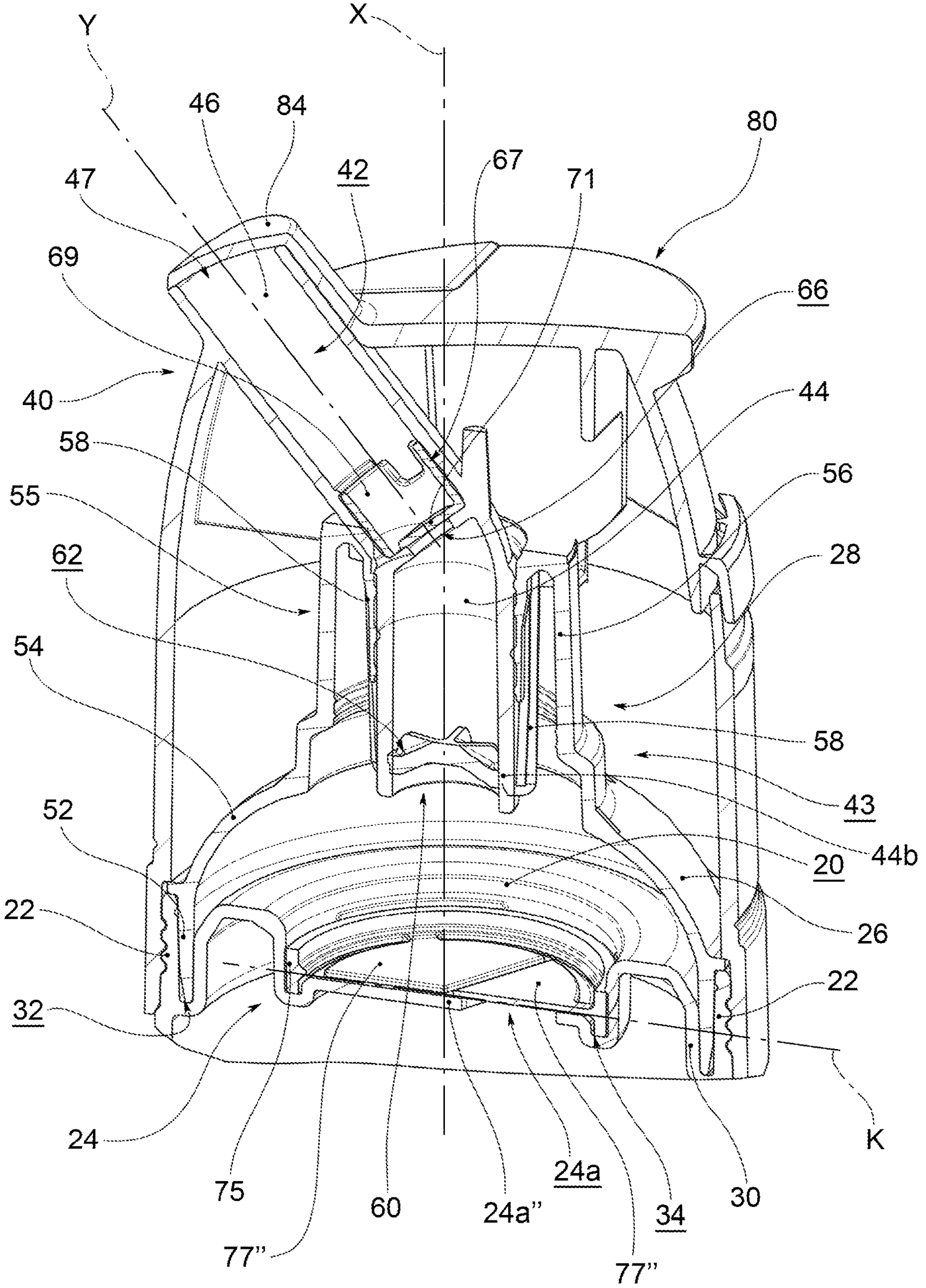
FIG. 5*a* is a cross-sectional view of a dispensing head of the dispenser according to another embodiment of the invention, in a rest configuration.
Figure 5B:
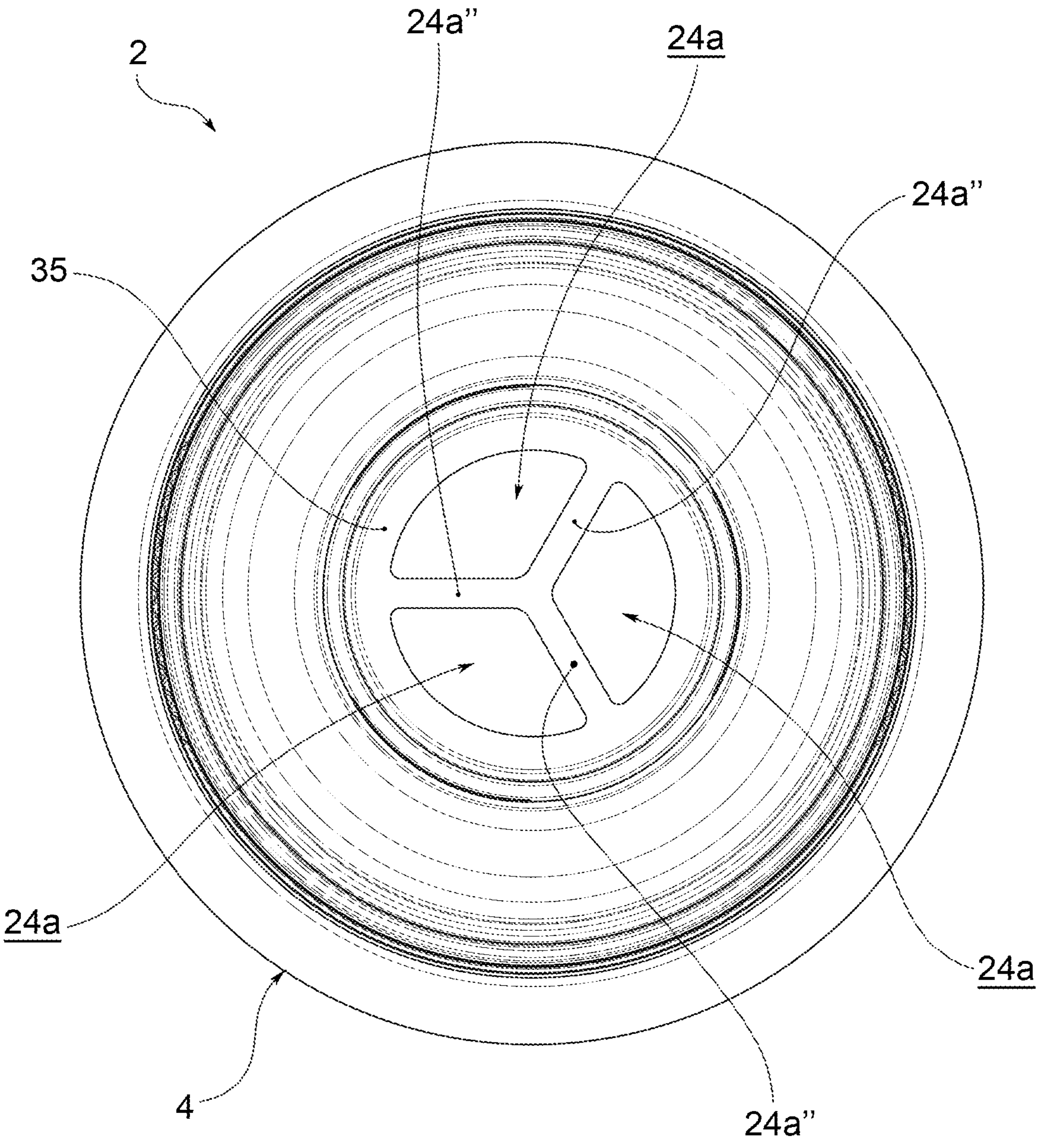
FIG. 5*b* is a plan view of a container tube of the dispenser according to another embodiment of the invention.
Figure 6A:
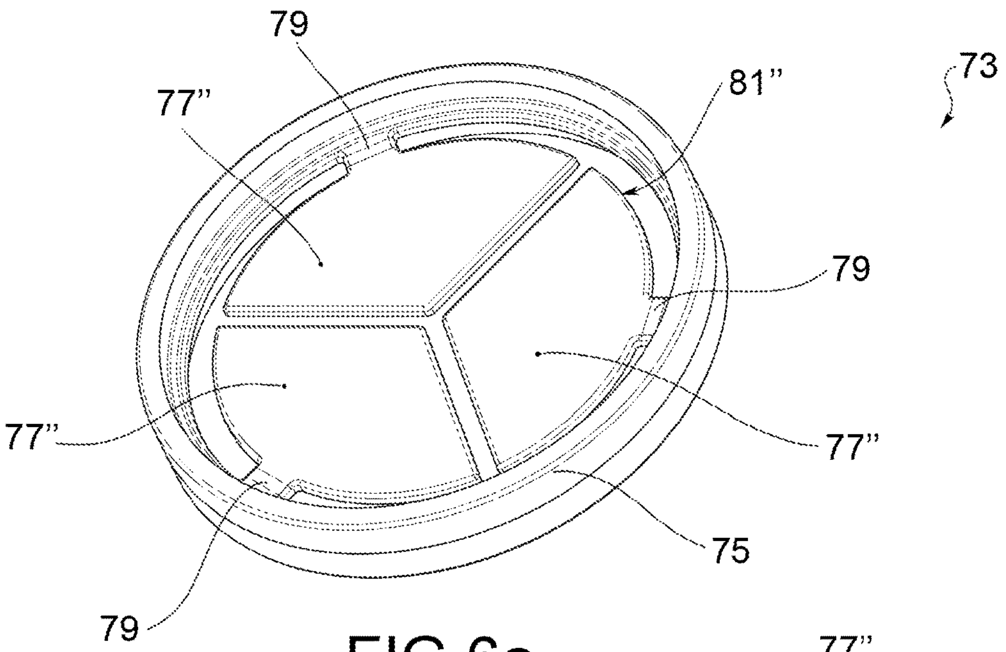
FIGS. 6*a* to 6*c* show a valve body of a suction valve of the dispenser according to another embodiment of the present invention.
Figure 6B:
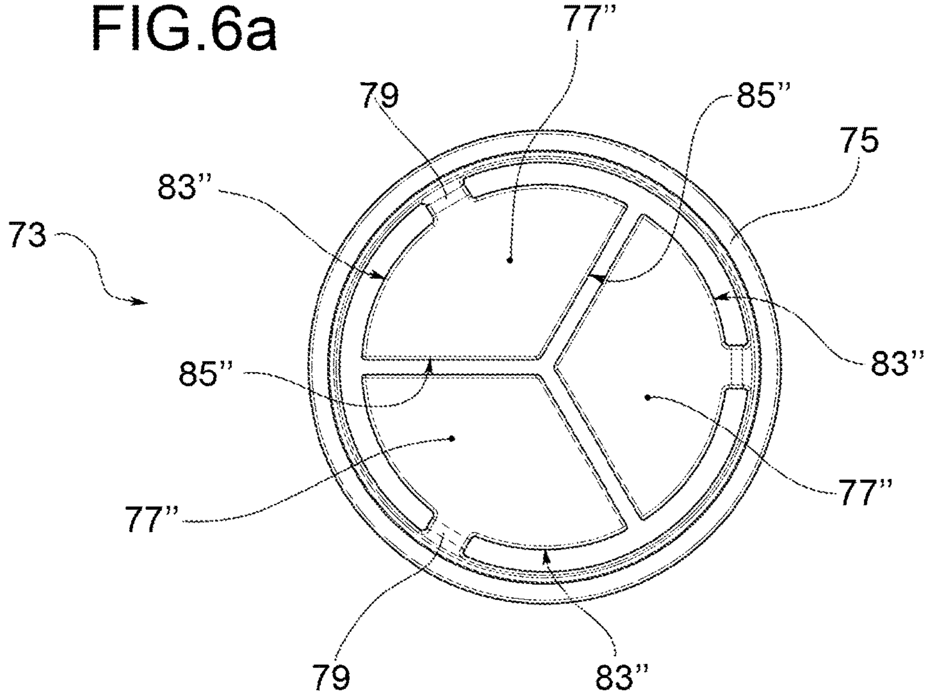
Figure 6C:
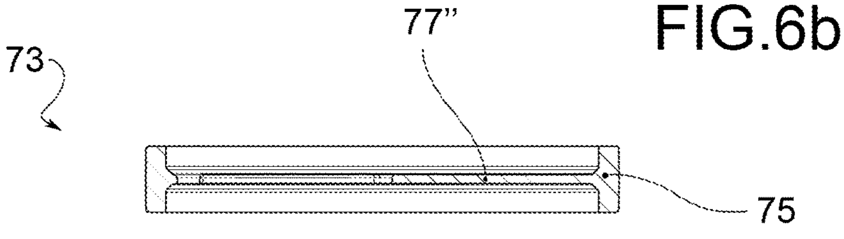

According to another embodiment variant (FIGS. 5*a*, 5*b*, and from 6a to 6*c*) in which the suction inlet 24*a* is divided by crosspieces 24*a*", preferably along a radius, the valve body 73 comprises three tabs 77": for example, each tab 77" is connected to the support 75 by a single hinge portion 79.

For example, each tab has a triangular shape, such as a lobed shape, provided with a perimeter edge 81" having an arched section 83", preferably in the shape of an arc of a circle, facing toward the support 75, and two straight sections 85" facing the straight sections of the other tabs.

In the closed configuration, the straight sections 85" of the tabs 77" press against the crosspieces 24*a*" of the suction inlet 24*a*, whereas the gap 75*a* between the arched sections 83" and the support 75 rests on the crown 35 of the separating wall 24.

In the open configuration, however, the tabs 77" bend due to the deformation of the hinge portions 79 and/or the tab itself, thus opening the suction inlet 24*a*.

The dispenser head 50 further comprises an actuator 80, for example in the form of a button, held so as to be movable such as by rotation or translation from the fixed head 40, and designed to influence the pump 28 so as to cause deformation of the cap 26 and product dispensing. For example, the actuator 80 comprises an influence portion 82 in contact with the connection area between the column portion 56 and the guide portion 58, such that the squeezing thereof causes deformation of the cap 26.

Preferably, the actuator 80 also comprises a closing portion 84 for closing the opening 47 of the dispensing duct 42 in a rest configuration of the dispenser.

The actuator 80 is made as a single part from plastic material, for example a polymer material chosen from the polyolefin group, such as polypropylene (PP).

Figure 3A:
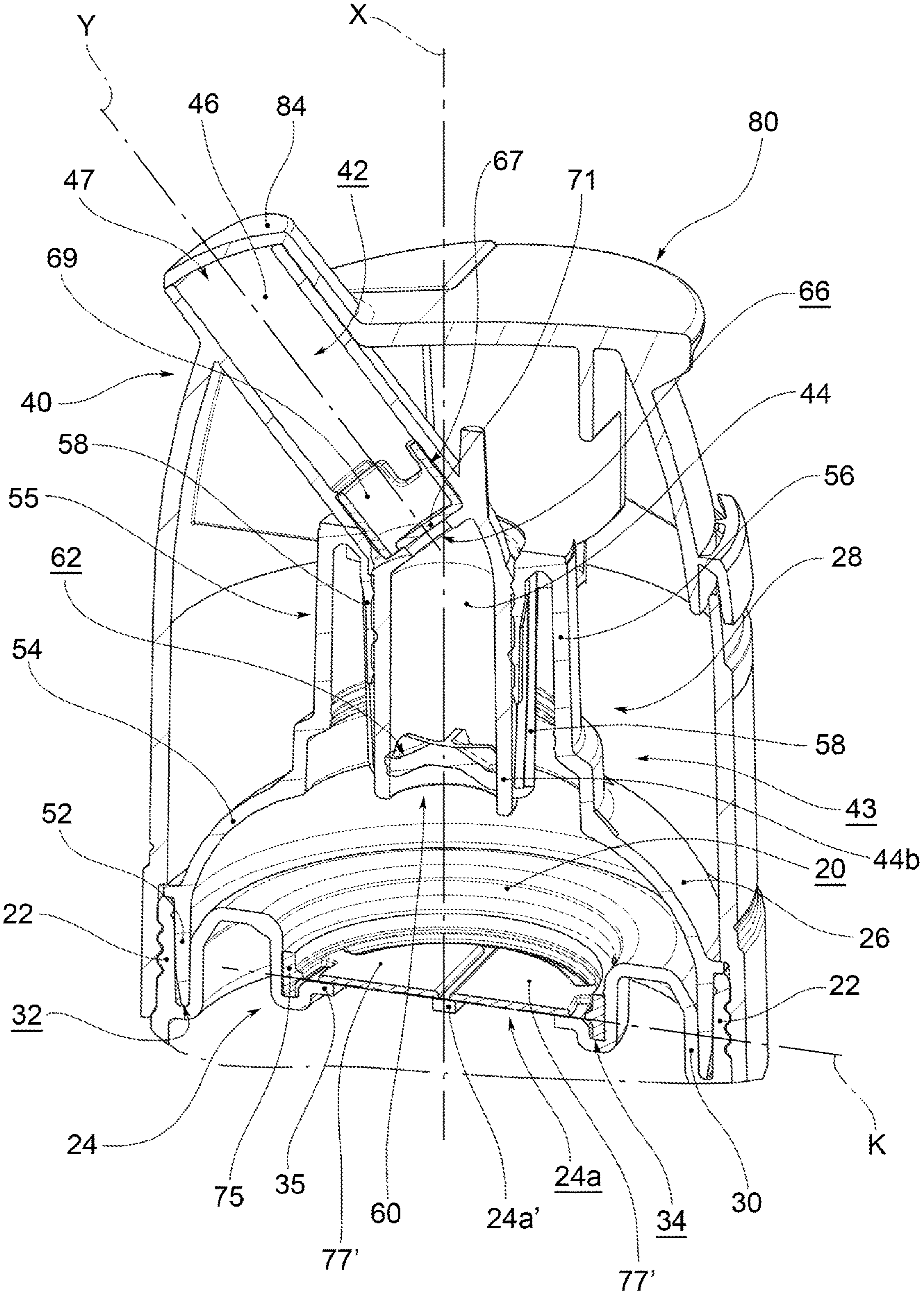
FIG. 3*a* is a cross-sectional view of a dispensing head of the dispenser according to one embodiment of the invention, in a rest configuration.
Figure 3B:
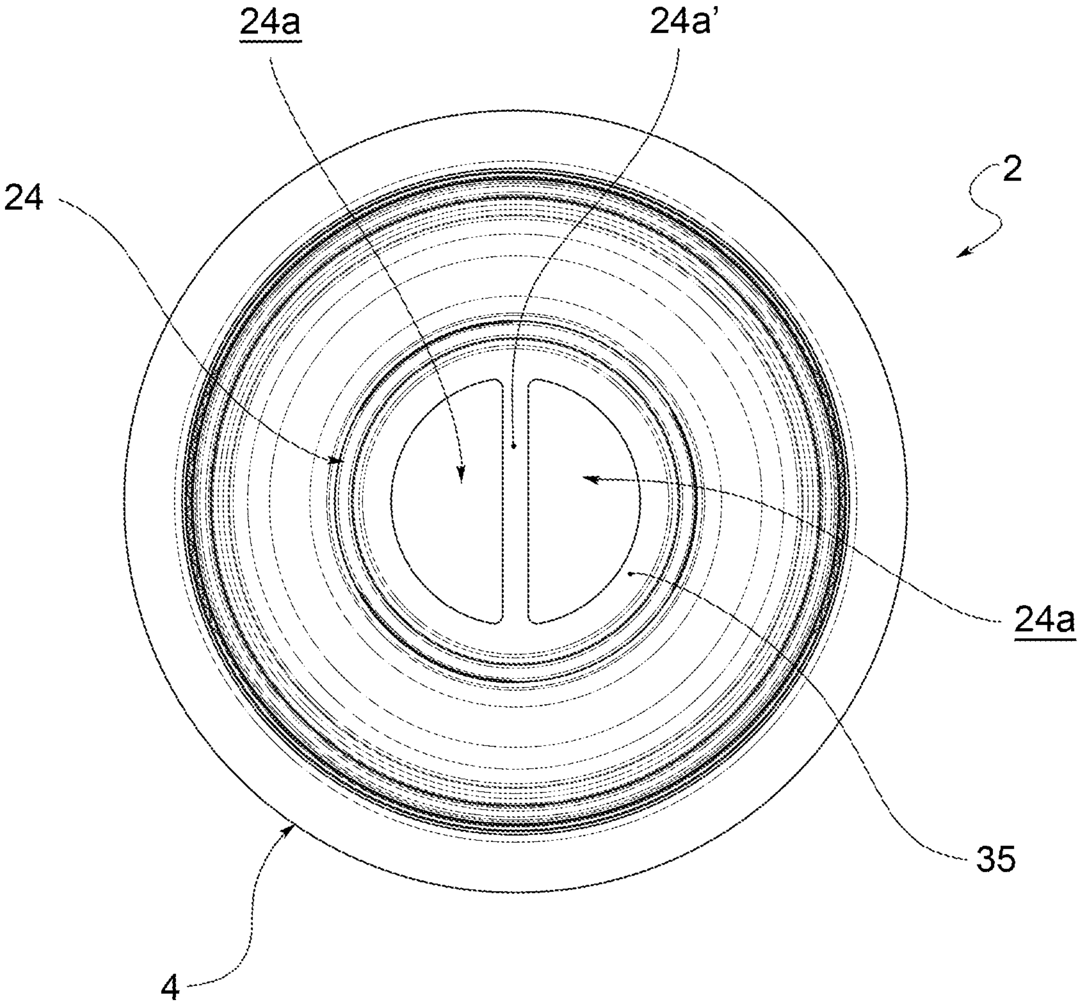
FIG. 3*b* is a plan view of a container tube of the dispenser according to an embodiment of the invention.
Figure 4A:
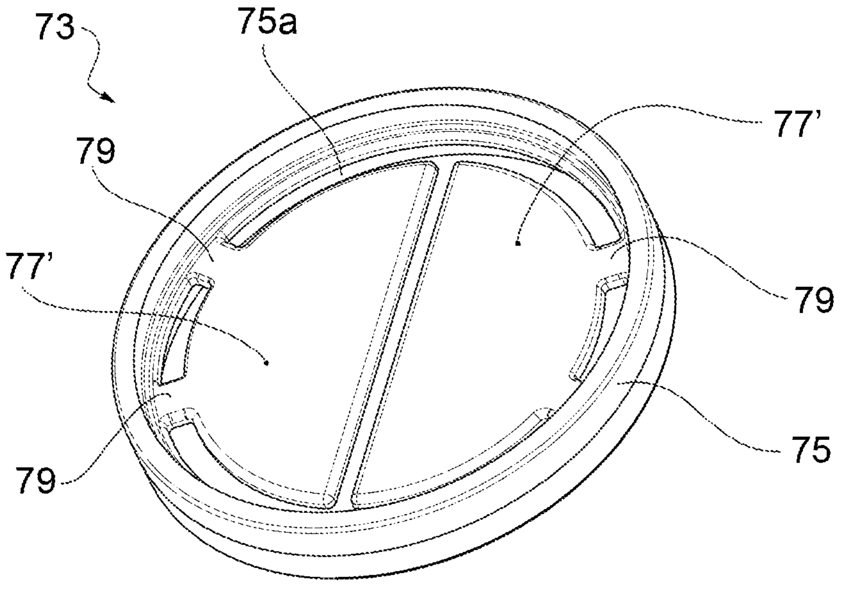
FIGS. 4*a* to 4*c* show a valve body of a suction valve of the dispenser according to one embodiment of the present invention.
Figure 4B:
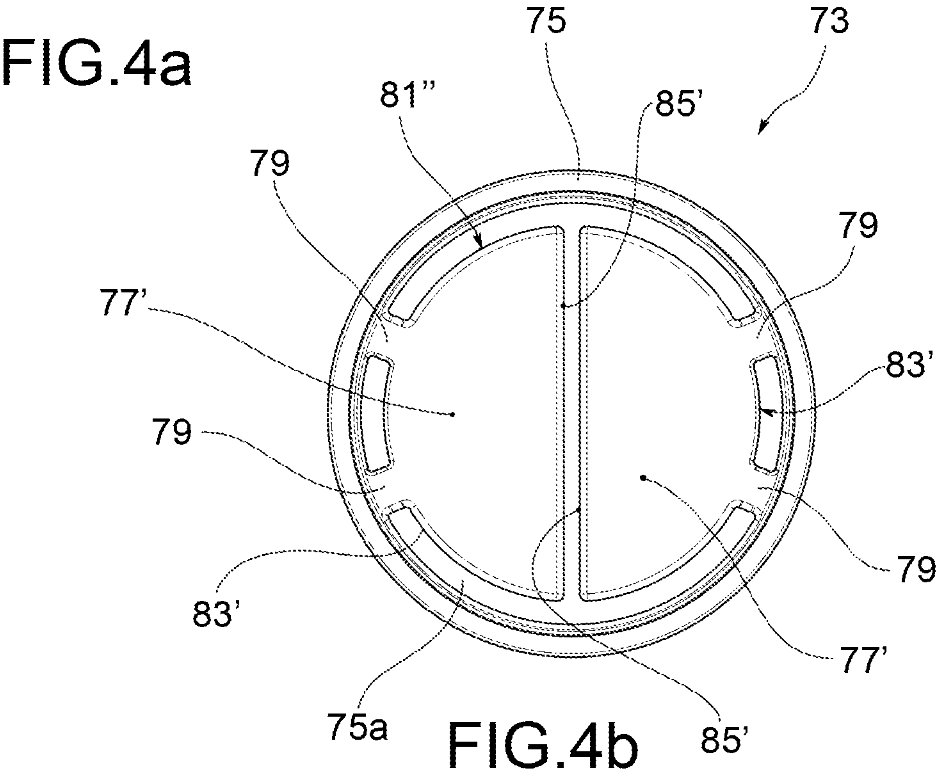
Figure 4C:
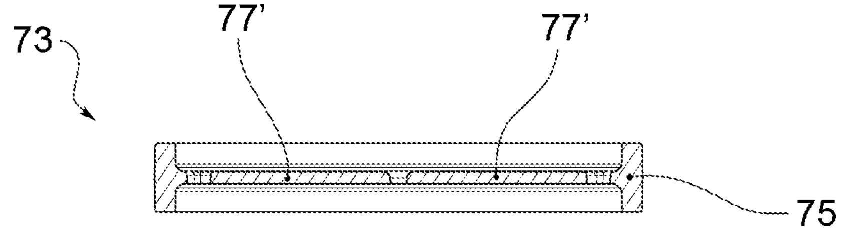

In an initial or rest configuration (FIGS. 3*a* and 5*a*), the pump 28 is in an initial non-deformed condition, the cup flap 71 closes off the delivery port 66 (delivery valve closed), the tabs 77',77" are in contact with the crosspieces 24*a*', 24*a*" and with the support crown 35 (suction valve closed), and the bottom 60 is engaged with the lower end of the initial section 44 in such a way that the bottom openings 62 are blocked (shutoff valve closed). In addition, the closing portion 84 of the actuator 80 blocks the opening 47 of the dispensing duct 42.

Figure 7:
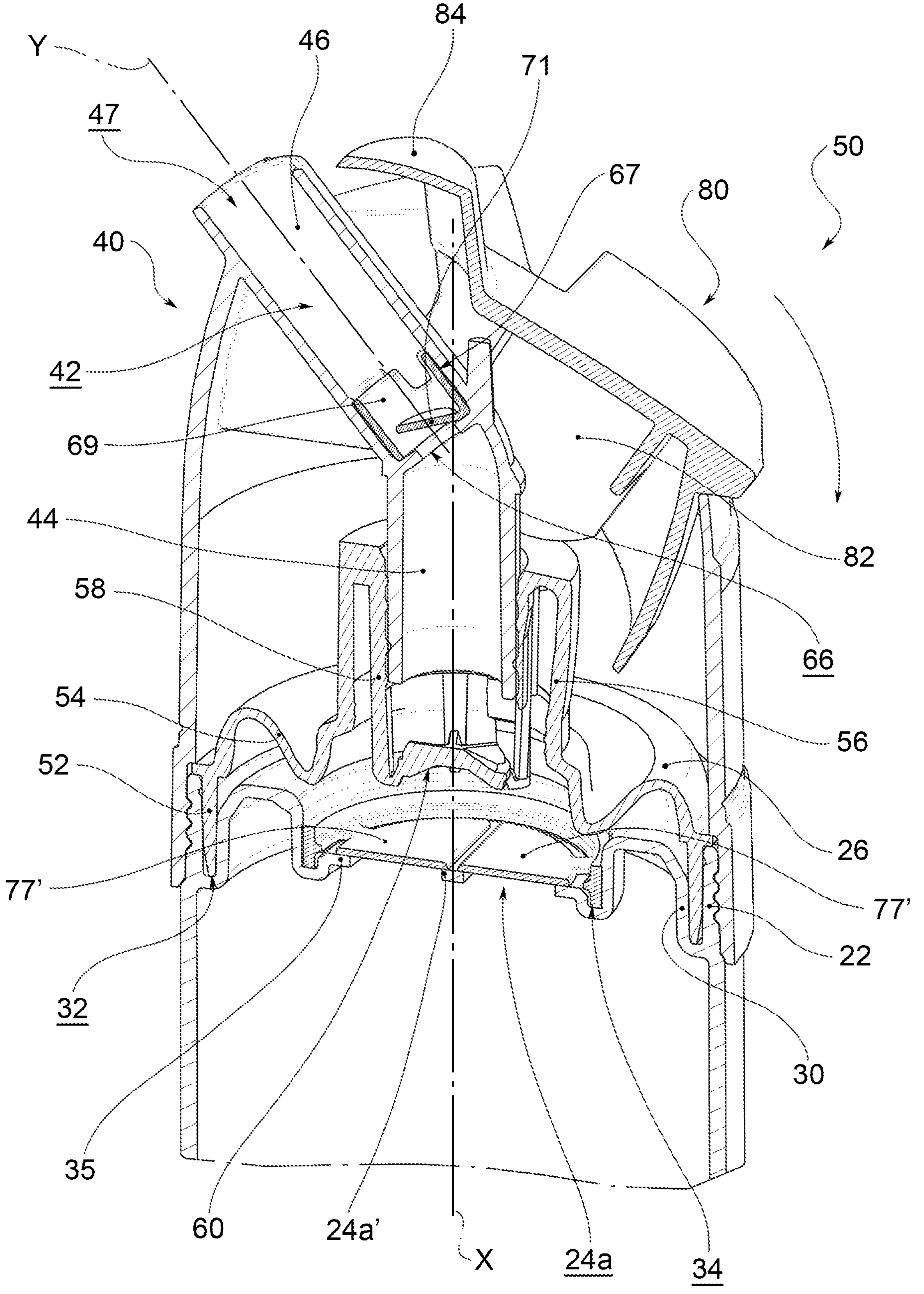
FIG. 7 is a cross-sectional view of the dispensing head in a product dispensing configuration.

A dispensing phase (FIG. 7) takes place by actuation of the actuator 80 by gradually deforming the pump 28 and in particular the cap 54.

When the actuator 80 is actuated, the closing portion 84 is disengaged at least partially from the opening 47, leaving it free to dispense the product.

During the dispensing phase, the cap 54 of the pump 28 is deformed, guided along the main axis X along which the guide portion 58 travels. An attendant reduction of the volume of the main chamber 20 occurs: the overpressure caused by the squeezed product keeps the suction valve 76 in the closed configuration. In other words, the tabs 77',77" are push tabs with sealed contact with the crosspieces 24*a*', 24*a*" and with the support crown 35, thus closing the suction inlet 24*a*. This prevents the product contained in the main chamber 20 from returning to the tube compartment 6 of the tube 2.

At the same time, due to the thrust of the actuator 80, the column portion 56 lowers, preferably guided in this movement by the guide portion 58, which slides as it is guided in contact with the dispensing duct 42 and in particular with the initial section 44 thereof.

The lowering of the column portion 56 causes the bottom 60 to lower and disengage from the initial section 44 of the dispensing duct 42: in particular, the lower end of the initial section 44 comes out through the bottom openings 62. The shutoff valve 64 thus changes to the open configuration and the product contained in the main chamber 20 comes through the bottom openings 62 in the bottom 60.

At the same time, due to the action of the product which is now located between the bottom 60 and the initial section 44 of the dispensing duct 42, the cup flap 71 moves away from the delivery port 66. The delivery valve thus changes to the open configuration and the product may come out through the opening 47 of the dispensing duct 42.

Figure 8:
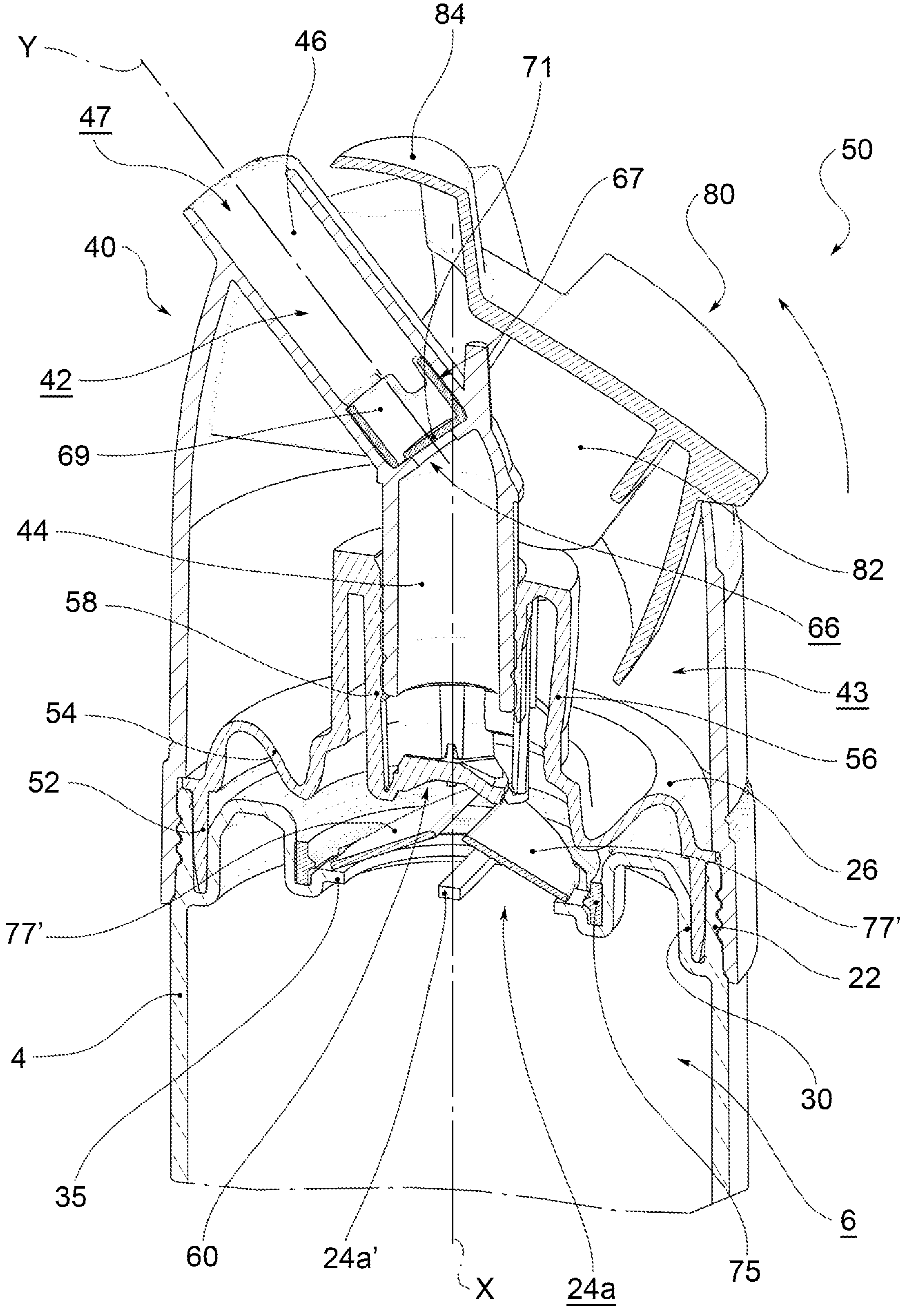
FIG. 8 is a cross-sectional view of the dispensing head in a product suction configuration.

When the actuator 80 reaches the end of travel, the dispensing phase ends and, after the actuator 80 is released, a suction phase occurs (FIG. 8), during which time a predefined quantity of product contained in the tube compartment 6 enters the main chamber 20.

In particular, when the actuator 80 is released, the pump 28 tends to return to the non-deformed condition and influences the actuator in that direction, which tends to return to the initial condition. Consequently, the volume of the main chamber 20 tends to increase and the resulting partial vacuum causes the tabs 77', 77" to bend, disengaging from the crosspieces 24*a*', 24*a*". A predefined quantity of product contained in the tube compartment 6 is thus drawn into the main chamber 20.

At the same time, the cup flap 71 recloses the delivery port 66 such that the delivery valve returns to the closed configuration. This ensures that the product in the dispensing duct 42 between the delivery valve and the opening 47 does not return to the main chamber 20, nullifying the suction of new product from the tube compartment 6.

At the same time, the closing portion 84 of the actuator 80 tends to return to the initial condition in which the opening 47 is blocked, thereby cutting off the flow of dispensed product and facilitating separation of the dispensed quantity.

Once the cap 54 has returned to the non-deformed condition, the bottom 60 also returns to the initial position in which it engages with the initial section 44; the shutoff valve 64 thus returns to the closed configuration and, since the overpressure in the main chamber has ceased, the suction valve 76 also returns to the closed configuration.

According to an embodiment variant of the invention, the separating wall is a part made separately from the tube 4 and subsequently applied thereto.

Innovatively, the dispenser according to the present invention is particularly well suited for dispensing pasty products and in particular has an especially effective suction phase thanks to the special arrangement of the suction inlet and the configuration of the suction valve.

It is clear that a person skilled in the art, in order to satisfy current needs, may make modifications to the dispenser described above, said modifications all being contained within the scope of protection as defined in the following claims.

What is claimed is:

1. A manually-operable head assembly for a dispenser for pasty products, comprising:

a fixed head adapted to be applied to a container tube of the dispenser, said fixed head comprising a dispensing duct provided with an opening for dispensing a product and with an initial section extending along a main axis;

a pump comprising an elastically deformable cap guided under deformation along said main axis;

an actuator movably supported by the fixed head and adapted to be manually operated to deform at least partially the pump and achieve dispensing of the product;

a separating wall cooperating with the pump, adapted to delimit at least partially a main chamber with the elastically deformable cap and to separate said main chamber from a tube compartment of the dispenser, wherein said separating wall comprises a suction inlet adapted to put the tube compartment in communication with the main chamber, lying on an imaginary plane orthogonal to the main axis; and a suction valve adapted to allow the product to pass from the tube compartment to the main chamber during a product suction step and to prevent the product from returning from the main chamber to the tube compartment during a product dispensing step;

wherein said suction valve comprises a valve body that cooperates with the suction inlet and comprises a plurality of tabs which, in the product suction step, flex and open the suction inlet and, in the product dispensing step, close the suction inlet, ein the valve body further comprises an annular support, supported by the separating wall, and a plurality of hinge portions, wherein each hinge portion of said plurality of hinge portions, being elastically deformable, joins at least one tab of the plurality of tabs to the annular support, and ein by said hinge portions, each tab of the plurality of tabs is arranged in a cantilever manner inside the annular support, spaced apart from said annular support to form an annular gap therewith, except at said hinge portions.

2. The manually-operable head assembly of claim 1, wherein the separating wall comprises a support crown, and wherein said annular gap is arranged on said support crown.

3. The manually-operable head assembly of claim 1, wherein the separating wall comprises at least one crosspiece that divides the suction inlet.

4. The manually-operable head assembly of claim 3, wherein, during the product dispensing step, the tabs cooperate with said at least one crosspiece to close the suction inlet.

5. The manually-operable head assembly of claim 3, wherein, during the product suction step, the tabs separate from said at least one crosspiece to open the suction inlet.

6. The manually-operable head assembly of claim 3, wherein the suction inlet is divided by a single crosspiece and the valve body comprises two tabs.

7. The manually-operable head assembly of claim 3, wherein the suction inlet is divided by three crosspieces and the valve body comprises three tabs.

8. A manually-operable dispenser for pasty products, comprising:

a container tube to contain a product; and a manually-operable head assembly according to claim 1, applied to the container tube.

9. The manually-operable dispenser of claim 8, wherein the separating wall is in a single piece with the container tube.

10. The manually-operable dispenser of claim 8, wherein the separating wall is a separate component from the container tube and applicable thereto.

* * * * *